US008760447B2

(12) United States Patent
Bendall et al.

(10) Patent No.: US 8,760,447 B2
(45) Date of Patent: Jun. 24, 2014

(54) METHOD OF DETERMINING THE PROFILE OF A SURFACE OF AN OBJECT

(75) Inventors: Clark Alexander Bendall, Syracuse, NY (US); Michael M. Ball, Marcellus, NY (US)

(73) Assignee: GE Inspection Technologies, LP, Lewistown, PA (US)

( * ) Notice: Subject to any disclaimer, the term of this patent is extended or adjusted under 35 U.S.C. 154(b) by 975 days.

(21) Appl. No.: 12/713,609

(22) Filed: Feb. 26, 2010

(65) Prior Publication Data

US 2011/0210961 A1 Sep. 1, 2011

(51) Int. Cl.
*G06T 15/00* (2011.01)

(52) U.S. Cl.
USPC ............... 345/419; 348/128; 348/129

(58) Field of Classification Search
CPC ....... G06T 7/0004; G06T 7/602; G01B 11/25
USPC .................... 345/419; 348/128–129
See application file for complete search history.

(56) References Cited

U.S. PATENT DOCUMENTS

| 6,459,481 | B1 | 10/2002 | Schaack |
|---|---|---|---|
| 6,670,962 | B2 * | 12/2003 | Perry et al. ............ 345/619 |
| 7,030,996 | B2 | 4/2006 | DeGroot et al. |
| 7,372,558 | B2 * | 5/2008 | Kaufman et al. ....... 356/237.2 |
| 7,570,363 | B2 | 8/2009 | Takahashi |
| 7,899,598 | B2 * | 3/2011 | Woon et al. ............ 701/50 |
| 8,300,920 | B2 * | 10/2012 | Chang et al. ........... 382/141 |
| 2009/0225321 | A1 | 9/2009 | Bendall et al. |
| 2009/0225329 | A1 | 9/2009 | Bendall et al. |
| 2009/0225333 | A1 | 9/2009 | Bendall et al. |

FOREIGN PATENT DOCUMENTS

| GB | 2328280 A | 2/1999 |
|---|---|---|
| WO | 2006/056614 A1 | 1/2006 |

OTHER PUBLICATIONS

Miniaturized three-dimensional endoscopic imaging system based on active stereovision Authors: Manhong Chan; Wumei Lin; Changhe Zhou; Qu Jianan Y Name and Date: Applied Optics ISSN 003-6935 Coden Apopai, 2003, vol. 42, n10, pp. 1888-1898 (11 page article).

* cited by examiner

*Primary Examiner* — Said Broome
*Assistant Examiner* — Peter Hoang
(74) *Attorney, Agent, or Firm* — Global Patent Operation; Mark A. Conklin

(57) ABSTRACT

A method of determining the profile of a surface of an object is disclosed that does not require that the video inspection device be at a certain angle relative to the surface when an image of the surface is obtained (e.g., allows non-perpendicular captures of the image 30). The method determines a reference surface and a reference surface line. The reference surface line is then used to determine a surface contour line on the surface of the object. The profile is then determined by determining the distances between the reference surface and the surface contour line.

19 Claims, 6 Drawing Sheets

METHOD OF DETERMINING THE PROFILE OF A SURFACE OF AN OBJECT

BACKGROUND OF THE INVENTION

The subject matter disclosed herein relates to a method of determining the profile of a surface of an object using a video inspection device.

Video inspection devices, such as video endoscopes, can be used to inspect a surface of an object to identify and analyze defects on that surface that may have resulted from damage, wear, or improper manufacturing of the object. In many instances, the surface is inaccessible and cannot be viewed without the use of the video inspection device. For example, a video endoscope can be used to inspect the surface of a blade of a turbine engine on an aircraft to identify any defects (e.g., cracks) that may have formed on the surface to determine if any repair or further maintenance is required on that turbine engine. In order to make that assessment, it is often necessary to obtain highly accurate dimensional measurements of the surface and the defect to verify that the defect does not exceed or fall outside an operational limit or required specification for that object.

In order to determine the dimensions of a defect on a surface, a video inspection device can be used to obtain and display an image of the surface on an object showing the defect. This image of the surface can be used to generate three-dimensional data of the surface that provides the three-dimensional coordinates (e.g., (x, y, z)) of a plurality of points on the surface, including the defect. In certain measurement systems, if the angle of the video inspection device relative to the surface when the image was obtained is known, these three-dimensional coordinates of the points on the surface can then be used to determine the dimensions of the defect. For example, some measurement systems require that the video inspection device be perpendicular to the surface when capturing an image of the surface. However, in many instances, due to the fact that surface is inaccessible, it is difficult or impossible to orient the video inspection device to be perpendicular to the surface when capturing an image of the surface. In these instances, the measurement system cannot be used to determine the dimensions of the defect. In other instances where it is possible to orient the video inspection device to be perpendicular to the surface when capturing an image of the surface, it is often difficult or impossible to confirm that the image was taken when the video inspection device was exactly perpendicular. In these instances, the measurement system will provide inaccurate dimensions of the defect.

It would be advantageous to provide a method for determining the profile of a surface of an object, including any defect on that surface, in order to determine the dimensions of that defect, wherein the method does not require that the video inspection device be at a certain angle relative to the surface when an image of the surface is obtained (e.g., would allow non-perpendicular captures of the image).

BRIEF DESCRIPTION OF THE INVENTION

In one embodiment, a method of determining the profile of a surface of an object is disclosed that does not require that the video inspection device be at a certain angle relative to the surface when an image of the surface is obtained (e.g., allows non-perpendicular captures of the image 30). The method determines a reference surface and a reference surface line. The reference surface line is then used to determine a surface contour line on the surface of the object. The profile is then determined by determining the distances between the reference surface and the surface contour line.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of invention. Thus, for further understanding of the invention, reference can be made to the following detailed description, read in connection with the drawings in which.

DETAILED DESCRIPTION OF THE INVENTION

Figure 1:
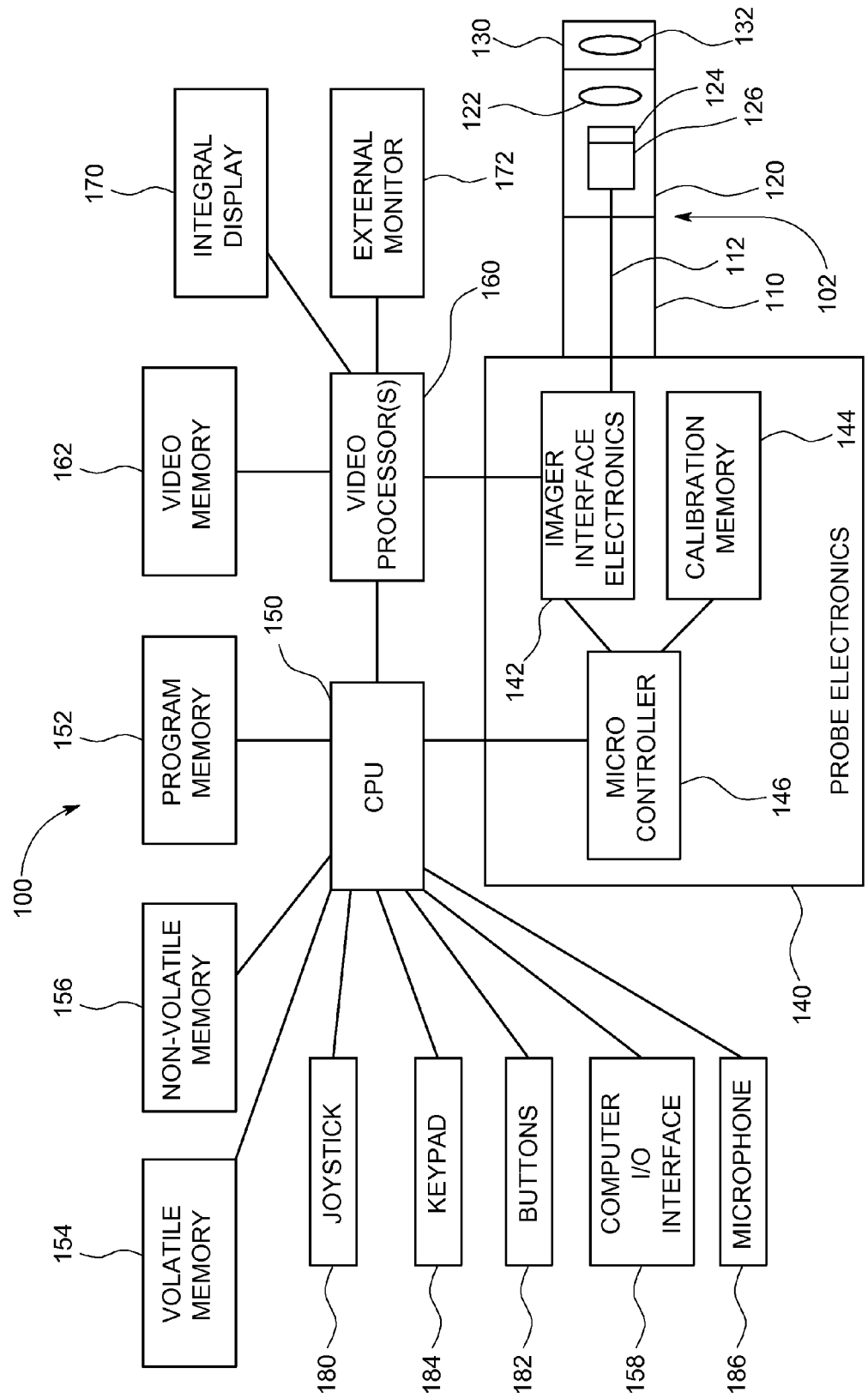
FIG. 1 is a block diagram of a video inspection device in an exemplary embodiment of the invention.

FIG. 1 is a block diagram of a video inspection device 100 in an exemplary embodiment of the invention. It will be understood that the video inspection device 100 shown in FIG. 1 is exemplary and that the scope of the invention is not limited to any particular video inspection device 100 or any particular configuration of components within a video inspection device 100.

Video inspection device 100 can include an elongated probe 102 comprising an insertion tube 110 and a head assembly 120 disposed at the distal end of the insertion tube 110. Insertion tube 110 can be a flexible, tubular section through which all interconnects between the head assembly 120 and probe electronics 140 are passed. Head assembly 120 can include probe optics 122 for guiding and focusing light from the object onto an imager 124. The probe optics 122 can comprise, e.g., a lens singlet or a lens having multiple components. The imager 124 can be a solid state CCD or CMOS image sensor for obtaining an image of the target object.

A detachable tip or adaptor 130 can be placed on the distal end of the head assembly 120. The detachable tip 130 can include tip viewing optics 132 (e.g., lenses, windows, or apertures) that work in conjunction with the probe optics 122 to guide and focus light from the target object onto an imager 124. The detachable tip 130 can also include illumination LEDs (not shown) if the source of light for the video inspection device 100 emanates from the tip 130 or a light passing element (not shown) for passing light from the probe 102 to the target object. The tip 130 can also provide the ability for side viewing by including a waveguide (e.g., a prism) to turn the camera view and light output to the side. The elements that can be included in the tip 130 can also be included in the probe 102 itself.

The imager 124 can include a plurality of pixels formed in a plurality of rows and columns and can generate image signals in the form of analog voltages representative of light incident on each pixel of the imager 124. The image signals can be propagated through imager hybrid 126, which provides electronics for signal buffering and conditioning, to an imager harness 112, which provides wires for control and video signals between the imager hybrid 126 and the imager interface electronics 142. The imager interface electronics 142 can include power supplies, a timing generator for generating imager clock signals, an analog front end for digitizing the imager video output signal, and a digital signal processor for processing the digitized imager video data into a more useful video format.

The imager interface electronics 142 are part of the probe electronics 140, which provide a collection of functions for operating the video inspection device 10. The probe electronics 140 can also include a calibration memory 144, which stores the calibration data for the probe 102 and/or tip 130. The microcontroller 146 can also be included in the probe electronics 140 for communicating with the imager interface electronics 142 to determine and set gain and exposure settings, storing and reading calibration data from the calibration memory 144, controlling the light delivered to the target object, and communicating with the CPU 150 of the video inspection device 10.

In addition to communicating with the microcontroller 146, the imager interface electronics 142 can also communicate with one or more video processors 160. The video processor 160 can receive a video signal from the imager interface electronics 142 and output signals to various monitors, including an integral display 170 or an external monitor 172. The integral display 170 can be an LCD screen built into the video inspection device 100 for displaying various images or data (e.g., the image of the target object, menus, cursors, measurement results) to an inspector. The external monitor 172 can be a video monitor or computer-type monitor connected to the video inspection device 100 for displaying various images or data.

The video processor 160 can provide/receive commands, status information, streaming video, still video images, and graphical overlays to/from the CPU 150 and may be comprised of FPGAs, DSPs, or other processing elements which provide functions such as image capture, image enhancement, graphical overlay merging, distortion correction, frame averaging, scaling, digital zooming, overlaying, merging, flipping, motion detection, and video format conversion and compression.

The CPU 150 can be used to manage the user interface by receiving input via a joystick 180, buttons 182, keypad 184, and/or microphone 186, in addition to providing a host of other functions, including image, video, and audio storage and recall functions, system control, and measurement processing. The joystick 180 can be manipulated by the user to perform such operations as menu selection, cursor movement, slider adjustment, and articulation control of the probe 102, and may include a push-button function. The buttons 182 and/or keypad 184 also can be used for menu selection and providing user commands to the CPU 150 (e.g., freezing or saving a still image). The microphone 186 can be used by the inspector to provide voice instructions to freeze or save a still image.

The video processor 160 can also communicate with video memory 162, which is used by the video processor 160 for frame buffering and temporary holding of data during processing. The CPU 150 can also communicate with CPU program memory 152 for storage of programs executed by the CPU 150. In addition, the CPU can be in communication with volatile memory 154 (e.g., RAM), and non-volatile memory 156 (e.g., flash memory device, a hard drive, a DVD, or an EPROM memory device). The non-volatile memory 156 is the primary storage for streaming video and still images.

The CPU 150 can also be in communication with a computer I/O interface 158, which provides various interfaces to peripheral devices and networks, such as USB, Firewire, Ethernet, audio I/O, and wireless transceivers. This computer I/O interface 158 can be used to save, recall, transmit, and/or receive still images, streaming video, or audio. For example, a USB "thumb drive" or CompactFlash memory card can be plugged into computer I/O interface 158. In addition, the video inspection device 100 can be configured to send frames of image data or streaming video data to an external computer or server. The video inspection device 100 can incorporate a TCP/IP communication protocol suite and can be incorporated in a wide area network including a plurality of local and remote computers, each of the computers also incorporating a TCP/IP communication protocol suite. With incorporation of TCP/IP protocol suite, the video inspection device 100 incorporates several transport layer protocols including TCP and UDP and several different layer protocols including HTTP and FTP.

Figure 2:
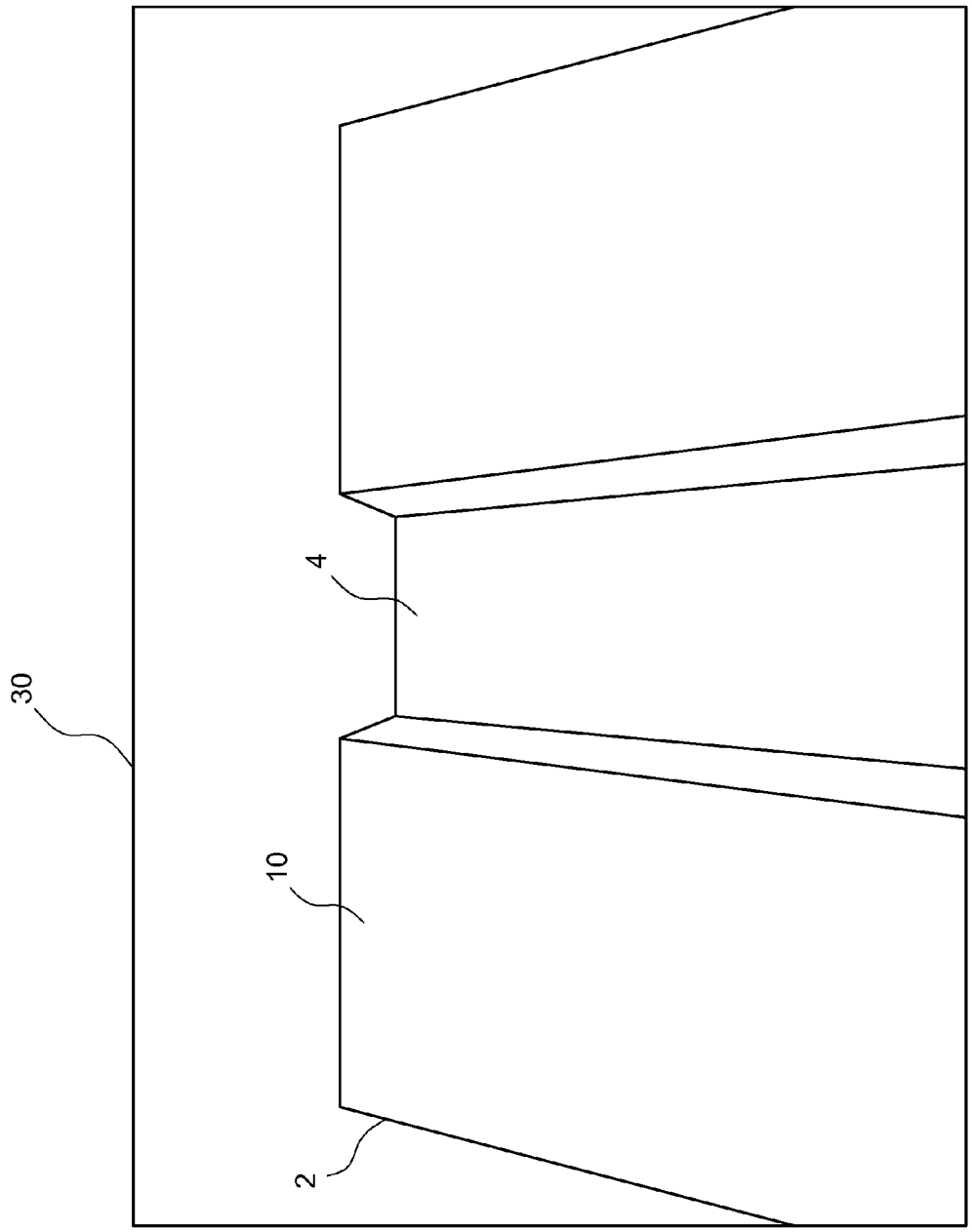
FIG. 2 is an image of a surface of an object having a defect in an exemplary embodiment of the invention.

FIG. 2 is an image 30 obtained by the video inspection device 100 of a surface 10 of an object 2 having a defect 4 in an exemplary embodiment of the invention. In this example, the defect 4 is shown as a trough where material has been removed from the surface 10 of the object 2 by damage or wear. It will be understood that the defect 4 shown in this exemplary embodiment is just one example and that the inventive method of determining the profile of a surface of an object applies to other types of defects (e.g., cracks, dents, corrosion pitting, coating loss, surface deposits, etc.). Once the image 30 is obtained, and the defect 4 is identified, the image 30 can be used to determine the dimensions of the defect 4 (e.g. height or depth, length, width, area, volume, etc.). In one embodiment, the image 30 used can be a two-dimensional image 30 of the surface 10 of the object 2.

Figure 3:
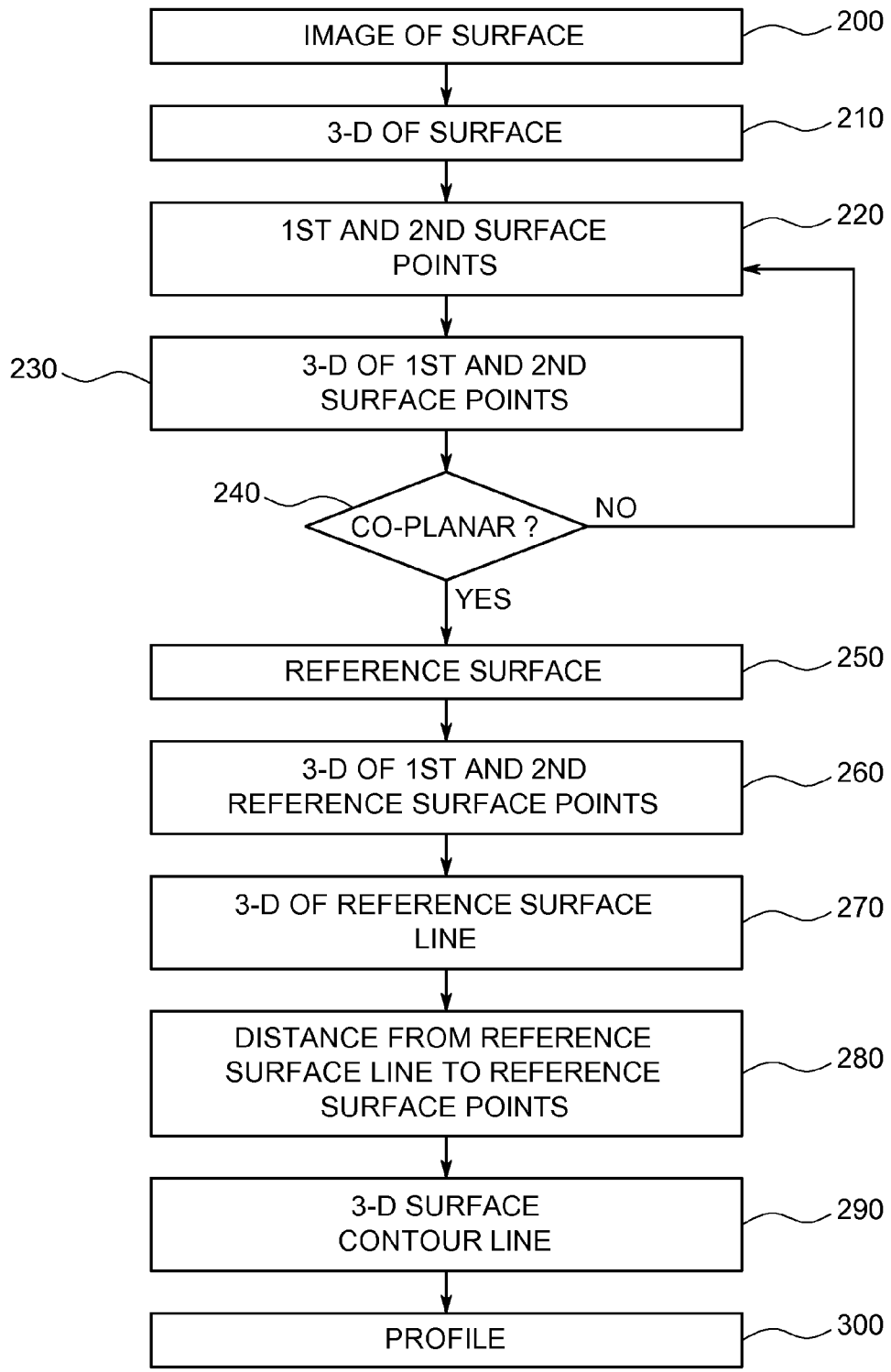
FIG. 3 is a flow diagram of a method of determining the profile of the surface of the object shown in the image of FIG. 1 in an exemplary embodiment of the invention.

FIG. 3 is a flow diagram of a method of determining the profile of the surface 10 of the object 2 shown in the image 30 of FIG. 1 in an exemplary embodiment of the invention. The steps described in the flow diagram of FIG. 2 are further illustrated in FIGS. 4 and 5, which show various points, surfaces, and lines that can be used to determine the profile of the surface of the object shown in the image of FIG. 1 in an exemplary embodiment of the invention. It will be understood that the steps described in the flow diagram of FIG. 2 can be performed in a different order than shown in the flow diagram and that not all of the steps are required for certain embodiments.

At step 200 and as shown in FIG. 2, the a user can use the video inspection device 100 to obtain an image 30 of a surface 10 of an object 2 having a defect 4 and display it on a video monitor (e.g., an integral display 170 or external monitor 172). At step 210, the video inspection device 100 can determine the three-dimensional coordinates (e.g., (x, y, z)) of a plurality of points on the surface 10 of the object 2, including the defect 4. In one embodiment, the video inspection device can generate three-dimensional data of the surface 10 of the object 2 from the image 30 in order to determine the three-dimensional coordinates. Several different existing techniques can be used to provide the three-dimensional coordinates of the points on the image 30 of the surface 10 (e.g., stereo, scanning systems, structured light methods such as phase shifting, phase shift moiré, laser dot projection, etc.). Most such techniques comprise the use of calibration data, which, among other things, includes optical characteristic data that is used to reduce errors in the three-dimensional coordinates that would otherwise be induced by optical distortions. With some techniques, the three-dimensional coordinates may be determined using one or more images captured in close time proximity that may include projected patterns and the like. It is to be understood that references to three-dimensional coordinates determined using image 30 may also comprise three-dimensional coordinates determined using one or a plurality of images 30 of surface 10 captured in close time proximity, and that the image 30 displayed to the user during the described operations may or may not actually be used in the determination of the three-dimensional coordinates.

Figure 4:
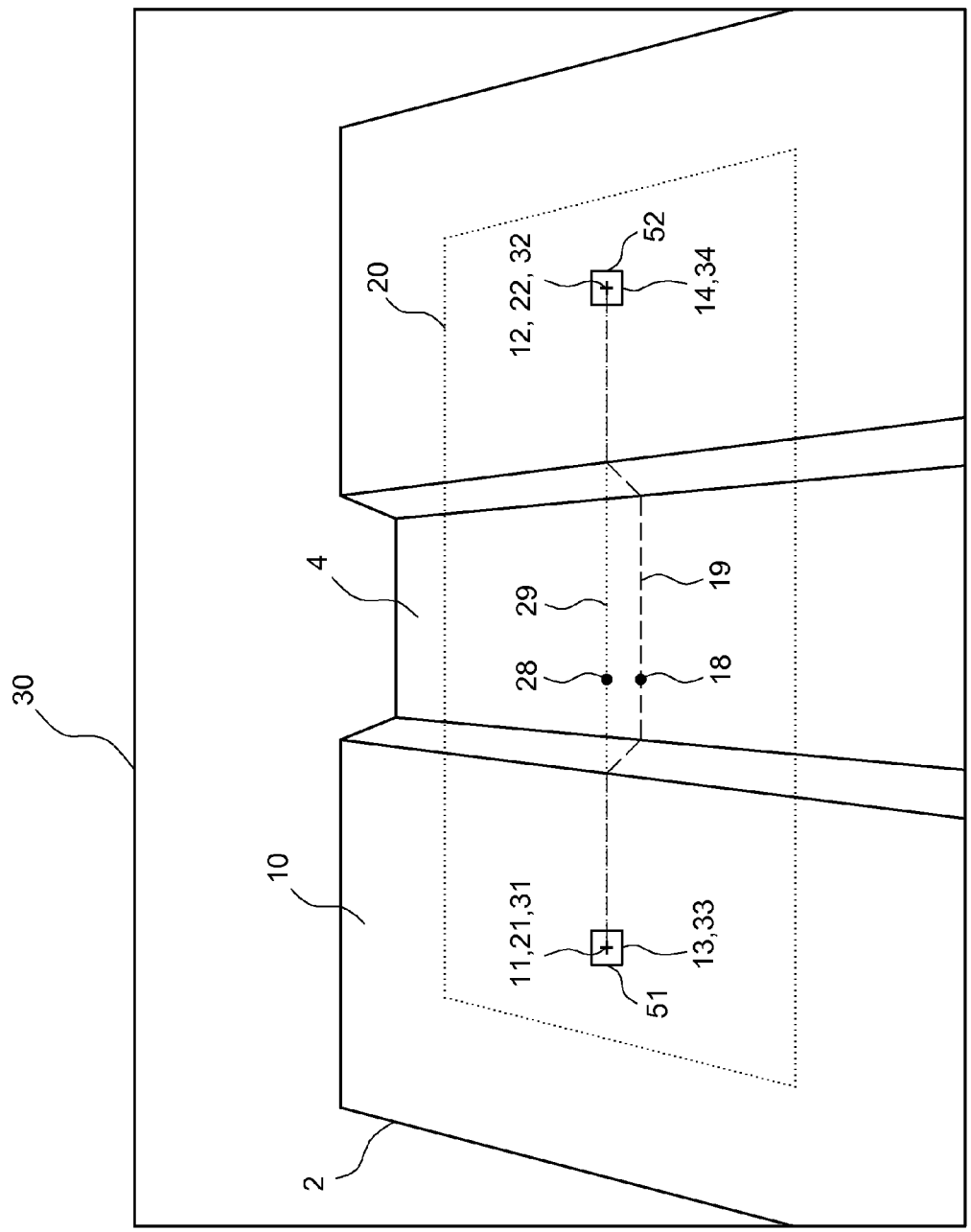
FIG. 4 shows various points, surfaces, and lines that can be used to determine the profile of the surface of the object shown in the image of FIG. 1 in an exemplary embodiment of the invention.

At step 220 and as shown in FIG. 4, a user can use the video inspection device 100 to select a first surface point 11 (e.g., a start surface point) and a second surface point 12 (e.g., a stop surface point) on the surface 10 of the object 2. In one embodiment, the first surface point 11 can be selected by placing a first cursor 51 (or other pointing device) on a first pixel 31 of the image 30 corresponding to the first surface point 11 on the surface 10. Similarly, the second surface point 12 can be selected by placing a second cursor 52 (or other pointing device) on a second pixel 32 of the image 30 corresponding to the second surface point 12 on the surface 10. In one embodiment, the first surface point 11 can be selected on one side (e.g. the left side) of the defect 4 to be measured, while the second surface point 12 can be selected on the other side (e.g., the right side) of the defect 4 to be measured. At step 230, the video inspection device 100 can determine the three-dimensional coordinates of the first surface point 11 ($x_{AS}$, $y_{AS}$, $z_{AS}$) and the second surface point 12 ($x_{BS}$, $y_{BS}$, $z_{BS}$) on the image 30 of the surface 10 of the object 2.

At step 240, the video inspection device 100 can confirm whether the first surface point 11 and the second surface point 12 are on a co-planar surface. This step 240 can be used when the reference surface 20 to be used is a plane. The step 240 can be modified if a different geometry or shape is used for the reference surface 20. In one embodiment, this step 240 of confirming can be accomplished by the video inspection device 100 identifying a first plurality of pixels 33 in the vicinity of the first pixel 31 of the image 30 corresponding to a first plurality of points 13 on the surface 10 in the vicinity of the first surface point 11. Similarly, the video inspection device 100 can identify a second plurality of pixels 34 in the vicinity of the second pixel 32 of the image 30 corresponding to a second plurality of points 14 on the surface 10 in the vicinity of the second surface point 12. In one embodiment, a total of 250 pixels can be identified in the vicinity of each of the first pixel 31 and the second pixel 32 (i.e., 250 points on the surface 10 in the vicinity of each of the first surface point 11 and the second surface point 12). In another embodiment, a total of two pixels/points can be identified in the vicinity of each of the first pixel 31/first surface point 11 and the second pixel 32/second surface point 12 so that a three-dimensional surface (e.g., a plane) can be determined at each location (i.e., a total of at least three pixels/points at each location). Once the first plurality of points 13 and second plurality of points 14 on the surface 10 in the vicinity of the first surface point 11 and the second surface point 12 have been identified, the video inspection device 100 can determine the three-dimensional coordinates of those points. In other embodiments, the user may identify other points either including or excluding points 11 and 12, that are used to determine a reference surface 20. For example, three additional cursors could be used to identify three separate points on the reference surface 20 that are used to determine a reference plane. Thus, points 11 and 12 may or may not be on the reference surface 20.

In one embodiment, the video inspection device 100 can perform a curve fitting of the three-dimensional coordinates of the first plurality of points 13 on the surface 10 to determine a first surface point equation (e.g., for a plane) having the following form:

$$k_{0ASP} + k_{1ASP} \cdot x_{iASP} + k_{2ASP} \cdot y_{iASP} = z_{iASP} \tag{1}$$

where ($x_{iASP}$, $y_{iASP}$, $z_{iASP}$) are coordinates of any three dimensional point on the defined plane and $k_{0ASP}$, $k_{1ASP}$, and $k_{2ASP}$ are coefficients obtained by a curve fitting of the three-dimensional coordinates.

Similarly, the video inspection device 100 can perform a curve fitting of the three-dimensional coordinates of the second plurality of points 14 on the surface 10 to determine a second surface point equation (e.g., for a plane) having the following form:

$$k_{0BSP} + k_{1BSP} \cdot x_{iBSP} + k_{2BSP} \cdot y_{iBSP} = z_{iBSP} \tag{2}$$

where ($x_{iBSP}$, $y_{iBSP}$, $z_{iBSP}$) are the coordinates of any three dimensional point on the defined plane and $k_{0BSP}$, $k_{1BSP}$, and $k_{2BSP}$ are coefficients obtained by a curve fitting of the three-dimensional coordinates.

After the first surface point equation (1) and second surface point equation (2) have been determined, the video inspection device 100 can confirm that the first surface point 11 ($x_{AS}$, $y_{AS}$, $z_{AS}$) and the second surface point 12 ($x_{BS}$, $y_{BS}$, $z_{BS}$) are on a co-planar surface to within a predetermined tolerance. Should a geometry of a reference surface 20 other than a plane, such as a cylinder or sphere, be used, video inspection device 100 can verify that the reference surface 20 can be fitted to the first plurality of points 13 and second plurality of points 14 to within a predetermined tolerance.

In one embodiment, the angle ($\theta$) between the normals of the two surface surfaces can be determined using the following steps:

$$A \cdot B = (-k_{1ASP} \cdot -k_{1BSP}) + (-k_{2ASP} \cdot -k_{2BSP}) + 1 \tag{3}$$

$$|A| = \sqrt{(-k_{1ASP})^2 + (-k_{2ASP})^2 + 1} \tag{4}$$

$$|B| = \sqrt{(-k_{1BSP})^2 + (-k_{2BSP})^2 + 1} \tag{5}$$

$$\theta = A \cdot \cos\left(\frac{A \cdot B}{|A| * |B|}\right) \tag{6}$$

If the angle ($\theta$) is greater than a threshold angle (e.g., 45°), then the first surface point 11 and the second surface point 12 are not on a co-planar surface and should be reselected at step 220. If the angle ($\theta$) is less than a threshold angle, then the process can continue to the next step.

In other embodiments, a single reference surface may be determined for areas defined by the first plurality of points 13 and second plurality of points 14, and a measure of how much the three-dimensional coordinates in those areas deviate from that single reference surface is determined and compared to a threshold value. In one such embodiment that assumes that the first surface point 11 and the second surface point 12 are on parallel planes, the video inspection device 100 can confirm that the first surface point 11 and the second surface point 12 are on a single planar surface by the following steps:

$$k'_{1SP}=(k_{1ASP}+k_{1BSP})/2 \text{ (i.e., average value)} \quad (7)$$

$$k'_{2SP}=(k_{2ASP}+k_{2BSP})/2 \text{ (i.e., average value)} \quad (8)$$

In one embodiment, after the average values of $k'_{1SP}$ and $k'_{2SP}$ are determined, the values of $k_{0iASP}$ for each of the first plurality of points 13 on the surface 10 in the vicinity of the first surface point 11 (e.g., 250 points ($x_{iASP}$, $y_{iASP}$, $z_{iASP}$)) and the values of $k_{0iASP}$ for each of the first plurality of points 14 on the surface 10 in the vicinity of the second surface point 12 (e.g., 250 points ($x_{iBSP}$, $y_{iBSP}$, $z_{iBSP}$)) can be determined by the following steps:

$$k_{0iASP}=z_{iASP}-k'_{1SP} \cdot x_{iASP}-k'_{2SP} \cdot y_{iASP} \quad (9)$$

$$k_{0iBSP}=z_{iBSP}-k'_{1SP} \cdot x_{iBSP}-k'_{2SP} \cdot y_{iBSP} \quad (10)$$

Next, the average values of $k_{0iASP}$ and $k_{0iBSP}$ can be determined by the averages below:

$$k'_{0ASP}=\text{average}(k_{0iASP}) \quad (11)$$

$$k'_{0BSP}=\text{average}(k_{0iBSP}) \quad (12)$$

If the difference between the $k_{0'ASP}$ coefficient and the $k_{0'BSP}$ coefficient is greater than a threshold value, then the first surface point 11 and the second surface point 12 are not on a planar surface and should be reselected at step 220. If the difference between the $k_{0'ASP}$ coefficient and the $k_{0'BSP}$ coefficient is less than a threshold value, then the process can continue to the next step.

At step 250 and as shown in FIG. 4, the video inspection device 100 can determine a reference surface 20 based on the three-dimensional coordinates of the first surface point 11 and the second surface point 12. In some embodiments, the reference surface 20 can be flat, while in other embodiments the reference surface 20 can be curved. Similarly, in one embodiment, the reference surface 20 can be in the form of a plane, while in other embodiments, the reference surface 20 can be in the form of a different shape (e.g., cylinder, sphere, etc.). Turning to the exemplary reference surface 20 of a plane shown in FIG. 4, the video inspection device 100 can perform a curve fitting of the three-dimensional coordinates of the first surface point 11, the second surface point 12, and at least one other surface point to determine a reference surface equation (e.g., for a plane) having the following form:

$$k_{0RS}+k_{1RS} \cdot x_{iRS}+k_{2RS} \cdot y_{iRS}=z_{iRS} \quad (13)$$

where ($x_{iRS}$, $y_{iRS}$, $z_{iRS}$) are the coordinates of the surface points and $k_{0RS}$, $k_{1RS}$, and $k_{2RS}$ are coefficients obtained by a curve fitting of the three-dimensional coordinates. In one embodiment, the reference surface 20 can be based on the three-dimensional coordinates of the first plurality of points 13 on the surface 10 ($x_{iASP}$, $y_{iASP}$, $z_{iASP}$) and the three-dimensional coordinates of the second plurality of points 14 on the surface 10 ($x_{iBSP}$, $y_{iBSP}$, $z_{iBSP}$). For example, the reference surface 20 (including the reference surface equation) can be determined by performing a curve fitting of the three-dimensional coordinates of the first plurality of points 13 on the surface 10 and the three-dimensional coordinates of the second plurality of points 14 on the surface 10.

It should be noted that a plurality of points (i.e., at least as many points as the number of k coefficients) are used to perform the fitting. The fitting finds the k coefficients that give the best fit to the points used (e.g., least squares approach). The k coefficients then define the plane or other reference surface 20 that approximates the three-dimensional points used. However, when you insert the x and y coordinates of the points used into the plane equation (13), the z results will generally not exactly match the z coordinates of the points due to noise and any deviation from a plane that may actually exist. Thus, the $x_{iRS}$ and $y_{iRS}$ can be any arbitrary values, and the resulting $z_{iRS}$ tells you the z of the defined plane at $x_{iRS}$, $y_{iRS}$. Accordingly, coordinates shown in these equations can be for arbitrary points exactly on the defined surface, not necessarily the points used in the fitting to determine the k coefficients.

At step 260 and as shown in FIG. 4, the video inspection device 100 can determine the three-dimensional coordinates of a first reference surface point 21 on the reference surface 20 corresponding to the first surface point 11 on the surface 10 and a second reference surface point 22 on the reference surface 20 corresponding to the second reference point 12 on the surface 10. In some circumstances, the three-dimensional coordinates of the first reference surface point 21 and the first surface point 11 can be the same. Similarly, the three-dimensional coordinates of the second reference surface point 22 and the second surface point 12 can be the same. However, in some circumstances, due to noise and/or small variations in the surface 10, the first surface point 11 and the second surface point 12 do not fall exactly on the reference surface 20, and therefore have different coordinates.

When determining points on the reference surface 20 that correspond to points on the surface 10, it is convenient to apply the concept of line directions, which convey the relative slopes of lines in the x, y, and z planes, and can be used to establish perpendicular or parallel lines. For a given line passing through two three-dimensional coordinates (x0, y0, z0) and (x1, y1, z1), the line directions (dx, dy, dz) may be defined as:

$$dx=x1-x0 \quad (14)$$

$$dy=y1-y0 \quad (15)$$

$$dz=z1-z0 \quad (16)$$

Given a point on a line (x0, y0, z0) and the line's directions (dx, dy, dz), the line can be defined by:

$$\frac{(x-x0)}{dx} = \frac{(y-y0)}{dy} = \frac{(z-z0)}{dz} \quad (17)$$

Thus, given any one of an x, y, or z coordinate, the remaining two can be computed. Parallel lines have the same or linearly scaled line directions. Two lines having directions (dx0, dy0, dz0) and (dx1, dy1, dz1) are perpendicular if:

$$dx0 \cdot dx1+dy0 \cdot dy1+dz0 \cdot dz1=0 \quad (18)$$

The directions for all lines normal to a reference plane defined using equation (13) are given by:

$$dx_{RSN}=-k_{1RS} \quad (19)$$

$$dy_{RSN}=-k_{2RS} \quad (20)$$

$$dz_{RSN}=1 \quad (21)$$

Based on equations (17) and (19) through (21), a line that is perpendicular to a reference surface 20 and passing through a surface point ($x_S$, $y_S$, $z_S$) can be defined as:

$$\frac{x-x_S}{-k_{1RS}} = \frac{y-y_S}{-k_{2RS}} = z-z_S \quad (22)$$

In one embodiment, the coordinates of a point on the reference surface 20 ($x_{iRS}$, $y_{iRS}$, $z_{iRS}$) that corresponds to a point on the surface 10 ($x_{iS}$, $y_{iS}$, $z_{iS}$) (e.g. three-dimensional coordinates a first reference surface point 21 on the reference surface 20 corresponding to the first surface point 11 on the surface 10), can be determined by defining a line normal to the reference plane having directions given in (19)-(21) and passing through ($x_{iS}$, $y_{iS}$, $z_{iS}$), and determining the coordinates of the intersection of that line with the reference plane. Thus, from equations (13) and (22):

$$z_{iRS} = \frac{(k_{1RS}^2 \cdot z_{iS} + k_{1RS} \cdot x_{iS} + k_{2RS}^2 \cdot z_{iS} + k_{2RS} \cdot y_{iS} + k_{ORS})}{(1 + k_{1RS}^2 + k_{2RS}^2)} \quad (23)$$

$$x_{iRS} = k_{1RS} \cdot (z_{iS} - z_{iRS}) + x_{iS} \quad (24)$$

$$y_{iRS} = k_{2RS} \cdot (z_{iS} - z_{iRS}) + y_{iS} \quad (25)$$

In one embodiment, these steps (equations (14) through (25)) can be used to determine the three-dimensional coordinates of a first reference surface point 21 ($x_{ARS}$, $y_{ARS}$, $z_{ARS}$) on the reference surface 20 corresponding to the first surface point 11 ($x_{AS}$, $y_{AS}$, $z_{AS}$) on the surface 10 and a second reference surface point 22 ($x_{BRS}$, $y_{BRS}$, $z_{BRS}$) on the reference surface 20 corresponding to the second reference point 12 ($x_{BS}$, $y_{BS}$, $z_{BS}$) on the surface 10.

At step 270 and as shown in FIG. 4, the video inspection device 100 can determine the three-dimensional coordinates of a reference surface line 29 on the reference surface 20 from the first reference surface point 21 to the second reference surface point 22. There are several methods of determining the three-dimensional coordinates of a reference surface line 29. In one embodiment where the reference surface 20 is a plane, the three-dimensional coordinates of a reference surface line point 28 ($x_{RSL}$, $y_{RSL}$, $z_{RSL}$) on the reference surface line 29 can be determined based on the three-dimensional coordinates of the first reference surface point 21 ($x_{ARS}$, $y_{ARS}$, $z_{ARS}$) and the second reference surface point 22 ($x_{BRS}$, $y_{BRS}$, $z_{BRS}$) using the following relationship, where knowledge of one of the coordinates of the reference surface line point 28 ($x_{RSL}$ or $y_{RSL}$ or $z_{RSL}$) can be used to determine the other two:

$$\frac{x_{RSL} - x_{ARS}}{x_{BRS} - x_{ARS}} = \frac{y_{RSL} - y_{ARS}}{y_{BRS} - y_{ARS}} = \frac{z_{RSL} - z_{ARS}}{z_{BRS} - z_{ARS}} \quad (26)$$

Once the three-dimensional coordinates of the reference surface line points 28 ($x_{iRSL}$, $y_{iRSL}$, $z_{iRSL}$) on reference surface line 29 are determined, the video inspection device 100 can determine the three-dimensional coordinates of a surface contour line 19 that is the projection of the reference surface line 29 onto the surface 10 of the object 2, perpendicular to the reference surface 29.

Figure 5:
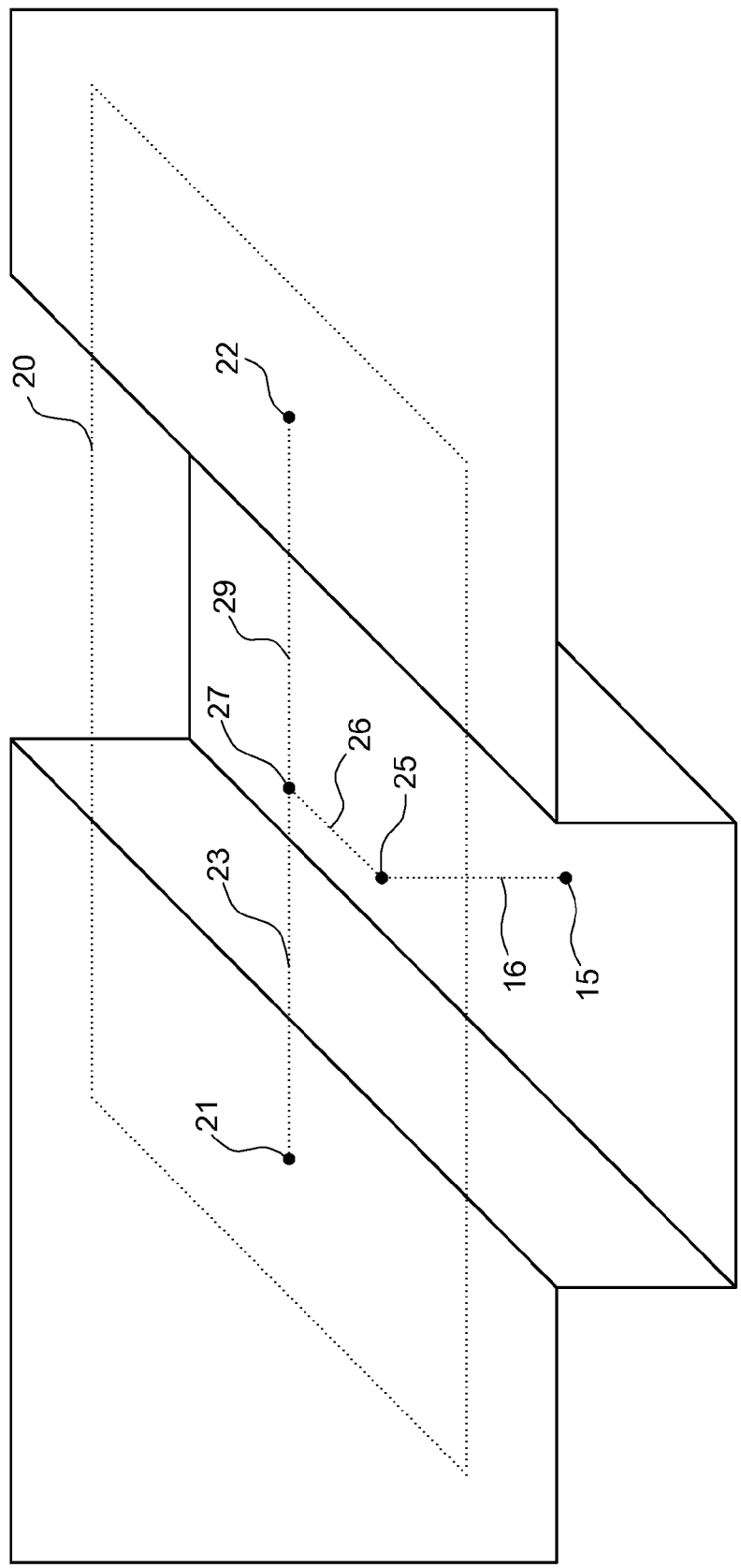
FIG. 5 is a perspective view showing various points, surfaces, and lines that can be used to determine the profile of the surface of the object shown in the image of FIG. 1 in an exemplary embodiment of the invention.

At step 280 and as shown in FIGS. 4 and 5, the video inspection device 100 can determine the distance of lines 26 from the reference surface line 29 to a plurality of reference surface points 25 ($x_{iRS}$, $y_{iRS}$, $z_{iRS}$) on the reference surface 20 where surface-to-reference surface lines 16 extending from a plurality of surface points 15 ($x_{iS}$, $y_{iS}$, $z_{iS}$) on the surface 10 are perpendicular to the reference surface 20 and intersect the reference surface 20.

In one embodiment, for each of the plurality of surface points 15 ($x_{iS}$, $y_{iS}$, $z_{iS}$), equations (14) through (25) can be used to determine the three-dimensional coordinates of the reference surface points 25 ($x_{iRS}$, $y_{iRS}$, $z_{iRS}$) on the reference surface 20 corresponding to the surface points 15 ($x_{iS}$, $y_{iS}$, $z_{iS}$) on the surface 10 (e.g., for each, the reference surface point 25 where a surface-to-reference surface line 16 extending from the surface points 15 is perpendicular to the reference surface 20 and intersects the reference surface 20.

In one embodiment, once the three-dimensional coordinates of the reference surface points 25 ($x_{iRS}$, $y_{iRS}$, $z_{iRS}$) are determined, the video inspection device 100 can determine the distances of lines 26 extending in the reference surface 20 from the reference surface points 25 that are perpendicular to the reference surface line 29 and intersect the reference surface line 29 at reference surface line intersection points 27 ($x_{iRSL1}$, $y_{iRSL1}$, $z_{iRSL1}$). The three-dimensional coordinates of the reference surface line intersection points 27 can be determined by the following steps:

$$dx = x_{BRS} - x_{ARS} \quad (27)$$

$$dy = y_{BRS} - y_{ARS} \quad (28)$$

$$dz = z_{BRS} - z_{ARS} \quad (29)$$

$$z_{iRSL} = \frac{(dx \cdot (dz \cdot (x_{iRS} - x_{BRS}) + dx \cdot z_{BRS}) + dy \cdot (dz \cdot (y_{iRS} - y_{BRS}) + dy \cdot z_{BRS}) + dz \cdot dz \cdot z_{iRS})}{(dx^2 + dy^2 + dz^2)} \quad (30)$$

$$y_{iRLSI} = \frac{dy \cdot (z_{iRLSI} - z_{BRS})}{dz + y_{BRS}} \quad (31)$$

$$x_{iRLSI} = \frac{dx \cdot (y_{iRLSI} - y_{BRS})}{dy + x_{BRS}} \quad (32)$$

In one embodiment, once the three-dimensional coordinates of the reference surface point intersection points 27 ($x_{iRSL1}$, $y_{iRSL1}$, $z_{iRSL1}$) corresponding to reference surface points 25 ($x_{iRS}$, $y_{iRS}$, $z_{iRS}$) are determined, the distance ($d_{26}$) of the line 26 between those points can be determined using the following:

$$d_{i26} = \sqrt{(x_{iRS} - x_{iRSLI})^2 + (y_{iRS} - y_{iRSLI})^2 + (z_{iRS} - z_{iRSLI})^2} \quad (33)$$

In one embodiment, this form of equation (33) can be used to determine the distance of a line between any two points on the reference surface 20 whose coordinates (x, y, z) are known (e.g., the distance ($d_{16}$) of surface-to-reference surface line 16 from a surface point 15 to a reference surface point 25, the distance ($d_{23}$) of the line 23 from a reference surface point intersection point 27 to the first reference surface point 21, etc.).

At step 290 and as shown in FIGS. 4 and 5, the video inspection device 100 can determine the three-dimensional coordinates of a surface contour line 19 on the surface 10 from the first reference surface point 21 to the second reference surface point 22 based on the surface points 15 whose perpendicular surface-to-reference surface lines 16 intersect the reference surface 20 on, or within a predetermined distance from, the reference surface line 29. For example, if the distance of line 26 for a particular reference surface point 25 is greater than a threshold value, that is an indication that the surface point 15 ($x_S$, $y_S$, $z_S$) corresponding to that reference surface point 25 is far from the desired surface contour line 19 that is the projection of the reference surface line 29 onto the surface 10 of the object 2, perpendicular to the reference surface 29. On the other hand, if the distance of the line 26 for a particular reference surface point 25 is zero or less than a threshold value, that is an indication that the surface point 15 ($x_S$, $y_S$, $z_S$) is on or near the desired surface contour line 19 that is the projection of the reference surface line 29 onto the surface 10 of the object 2, perpendicular to the reference surface 29.

In one embodiment, the video inspection device 100 can select from the surface points 15 the set of surface contour line points 18 ($x_{iSCL}$, $y_{iSCL}$, $z_{iSCL}$) whose corresponding reference surface points 25 have lines 26 with distances (($d_{26}$) given by equation (33)) that are less than a threshold value that can form the surface contour line 19. The video inspection device 100 can display an overlay on the image 30 of the surface 10 indicating the location of the surface contour line 19 on the surface.

In one embodiment, the video inspection device 100 can sort the surface contour line points 18 ($x_{iSCL}$, $y_{iSCL}$, $z_{iSCL}$) based on the distance ($d_{23}$) of the line 23 from the corresponding reference surface point intersection point 27 to a first reference surface point 21 (e.g., from smallest distance to largest distance). Next, the video inspection device can create a connected graph (network) of these sorted surface contour line points 18, where the distance between graph nodes is the distance between the surface contour line points' 18 pixel coordinates. In one embodiment, only pixels that are horizontally, vertically, or diagonally adjacent are connected. Dijkstra's algorithm can be used to find the shortest path (list of points) from the surface contour line point 18 closest to the first reference surface point 21 to the surface contour line point 18 closest to the second reference surface point 22. If not all surface contour line points 18 are connected, the Dijkstra's algorithm can be restarted using the closest unconnected surface contour line point 18 to the furthest surface contour line point 18 of the current path, and setting its initial pixel distance to the distance of the furthest contour line point 18+1000. This process creates a list of line segments, where the segment start point is the initial point used by the algorithm, and the segment stop point is the furthest point from the segment start point.

In one embodiment, these segments can be connected using the following algorithm: (1) make the first segment the current segment; (2) go through all the remaining unconnected segments and find the one whose start point is closest to the stop point of the current segment and if the stop point of the segment precedes (in the sorted list) the stop point of the current segment, discard it; (3) if the closest segment distance is much closer than the first segment distance and less than a constant, connect that segment. Otherwise, connect the first unconnected segment; (4) make the connected segment the current segment; (5) repeat steps 2 through 4 until all segments are connected or discarded.

Figure 6:
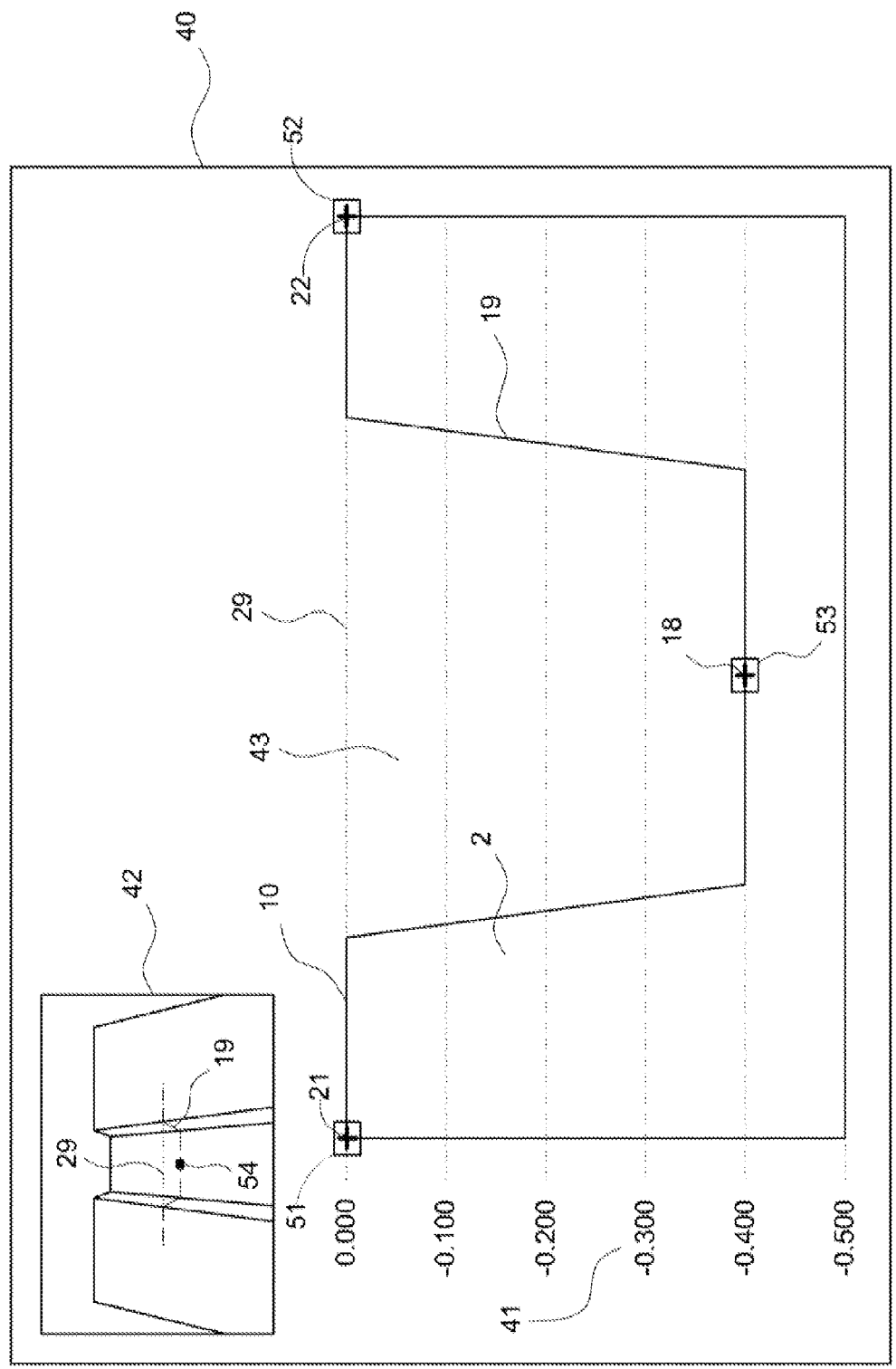
FIG. 6 is a graphical representation of the profile of the surface of the object shown in the image of FIG. 1 in an exemplary embodiment of the invention.

At step 300 and as shown in FIGS. 4 and 6, the video inspection device can determine the profile of the surface 10 of the object 2 by determining the distance (e.g., the perpendicular distance) from the reference surface 20 to the surface contour line 19 from the first reference surface point 21 ($x_{ARS}$, $y_{ARS}$, $z_{ARS}$) to the second reference surface point 22 ($x_{BRS}$, $y_{BRS}$, $z_{BRS}$). In another embodiment, rather than use the first reference surface point 21 and the second reference surface point 52, first cursor 51 and second cursor 52 can be used to select two points on the surface 10 and video inspection device 100 can draw a line between those two points. In one embodiment, the video inspection device 100 can automatically determine and display the area of the space 43 between the reference surface 20 (or the line drawn between the two surface points selected by the first cursor 51 and the second cursor 52) and the surface contour line 19. The area can be determined by dividing the space 43 between the reference surface line 29 and the surface contour line 19 into a plurality of polygons, such as rectangles, and summing the areas of those polygons. The video inspection device 100 can also automatically determine and display the distance from the reference surface 20 (or the line drawn between the two surface points selected by the first cursor 51 and the second cursor 52) to the point on the surface contour line 19 that is the furthest from the reference surface 20 to indicate the deepest or highest point in the defect 4. In one embodiment, the distance or area between the reference surface 20 (or the line drawn between the two surface points selected by the first cursor 51 and the second cursor 52) and the surface contour line 19 can be the distance or area between the reference surface line 29 (or the line drawn between the two surface points selected by the first cursor 51 and the second cursor 52) and the surface contour line 19.

In one embodiment and as shown in FIG. 6, the video inspection device 100 can display a graphical representation 40 of the profile of the surface 10 comprising a cross-section of the object 2 at the surface contour line 19 from the first reference surface point 21 to the second reference surface point 22 (or between the two surface points selected by the first cursor 51 and the second cursor 52). The reference surface line 29 may not be shown in some embodiments. The graphical representation 40 can also have a scale 41 indicating the distance from the reference surface 20 to the surface contour line 19. This graphical representation 40 can also be accompanied by a thumbnail 42 of the image 30 of the surface 10 of the object 2, also showing the surface contour line 29.

In one embodiment, a user can use the video inspection device 100 to place a third cursor 53 on the surface contour line 19 to select a surface contour line point 18. A fourth cursor 54, corresponding to the third cursor 53, can also be simultaneously displayed in the thumbnail 42 of the image 30. The video inspection device 100 can then determine and display the distance from the selected surface contour line point 18 to the reference surface 20 (or the line drawn between the two surface points selected by the first cursor 51 and the second cursor 52).

Returning to FIG. 6, in one embodiment, the graphical representation 40 of the profile of the surface 10 can be determined by a plot of the distances from the surface contour line points 18 on the surface contour line 19 to the reference surface 20 (or the line drawn between the two surface points selected by the first cursor 51 and the second cursor 52). In one embodiment, the reference surface line 29 (or the line drawn between the two surface points selected by the first cursor 51 and the second cursor 52) can be divided into equally spaced reference surface line points 28, each corresponding to an x-value of the graphical representation 40. For each reference surface line point 28, the distance from the surface contour line 19 to the reference surface 20 (or the line drawn between the two surface points selected by the first cursor 51 and the second cursor 52) can be determined by selecting the surface contour line points 18 whose corresponding reference surface points 25 are within a certain threshold distance from the reference surface line point 28, and determining the weighted average of the distance from those selected surface contour line points 18 to the reference surface line point 28. The weight assigned to the distance of each selected surface contour line points 18 can be inversely proportional to the distance from the reference surface point 25 corresponding to that surface contour line point 18 to the reference surface line point 28 (i.e., the smaller the distance, the greater the weight).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of determining a profile of an object surface comprising the steps of:
- obtaining an image of said object surface with an imager;
- displaying on a monitor an image of said object surface;
- determining the three-dimensional coordinates of a plurality of points on said object surface using a central processor unit;
- determining a reference surface using the central processor unit;
- determining the three-dimensional coordinates of a reference surface line on said reference surface using the central processor unit;
- determining a plurality of points on said reference surface corresponding to said plurality of points on said object surface, where object surface-to-reference surface lines extending from said plurality of points on said object surface are perpendicular to said reference surface and intersect said reference surface at said plurality of points on said reference surface using the central processor unit;
- determining the distances on said reference surface from said plurality of points on said reference surface to said reference surface line using the central processor unit;
- determining the points on said reference surface on, or within a predetermined distance from, said reference surface line using the central processor unit;
- determining the three-dimensional coordinates of a surface contour line on said object surface comprising the points on said object surface corresponding to the points on said reference surface on, or within a predetermined distance from, said reference surface line using the central processor unit; and
- determining said profile of said object surface by determining the distances from said reference surface to said surface contour line using the central processor unit.

2. The method of claim 1, wherein said reference surface is one of a plane, a cylinder, and a sphere.

3. The method of claim 1, further comprising the steps of:
- selecting a first surface point on said object surface by placing a first cursor on a first pixel of said image corresponding to said first surface point on said object surface; and
- selecting a second surface point on said object surface by placing a second cursor on a second pixel of said image corresponding to said second surface point on said object surface.

4. The method of claim 3, wherein said step of determining a reference surface comprises the steps of:
- identifying a first plurality of pixels in the vicinity of said first pixel of said image corresponding to a first plurality of points on said object surface in the vicinity of said first surface point using the central processor unit;
- identifying a second plurality of pixels in the vicinity of said second pixel of said image corresponding to a second plurality of points on said object surface in the vicinity of said second surface point using the central processor unit;
- determining the three-dimensional coordinates of said first plurality of points on said object surface using the central processor unit;
- determining the three-dimensional coordinates of said second plurality of points on said object surface using the central processor unit;
- determining said reference surface based on said three-dimensional coordinates of said first plurality of points on said object surface and said three-dimensional coordinates of said second plurality of points on said object surface using the central processor unit.

5. The method of claim 4, wherein the step of determining said reference surface comprises performing a curve fitting of said three-dimensional coordinates of said first plurality of points on said object surface and said three-dimensional coordinates of said second plurality of points on said object surface using the central processor unit.

6. The method of claim 4, further comprising the step of confirming that the first surface point and the second surface point are on a planar surface before determining said reference surface using the central processor unit.

7. The method of claim 6, wherein said step of confirming comprises comparing a first surface point equation based on curve fitting said three-dimensional coordinates of said first plurality of points on said object surface to a second surface point equation based on curve fitting said three-dimensional coordinates of said second plurality of points on said object surface using the central processor unit.

8. The method of claim 1, wherein said step of determining said reference surface comprises identifying three or more points on said object surface.

9. The method of claim 8, wherein said step of determining said reference surface further comprises performing a curve fit of said three or more points on said object surface using the central processor unit.

10. The method of claim 1, further comprising the steps of:
- determining the distance from said reference surface to the point on said surface contour line that is the furthest from said reference surface using the central processor unit; and
- displaying on the monitor the distance from said reference surface to the point on said surface contour line that is the furthest from said reference surface.

11. The method of claim 1, further comprising the steps of:
- determining the area between said reference surface and said surface contour line using the central processor unit; and
- displaying on the monitor the area between said reference surface and said surface contour line.

12. The method of claim 1, further comprising the step of displaying on the monitor a graphical representation of said profile of said object surface comprising a cross-section of said object at said surface contour line.

13. The method of claim 12, further comprising the steps of:
- determining a scale indicating the distance from said reference surface to said surface contour line using the central processor unit; and
- displaying the scale indicating the distance from said reference surface to said surface contour line on the monitor.

14. The method of claim 3, further comprising the steps of:
- displaying on the monitor a graphical representation of said profile of said object surface comprising a cross-section of said object at said surface contour line;
- placing a third cursor on said graphical representation on a surface contour line point on said surface contour line to determine the distance from said surface contour line point to said reference surface using the central processor unit; and displaying on the monitor the distance from said surface contour line point to said reference surface.

15. The method of claim 3, further comprising the steps of:

displaying on the monitor a graphical representation of said profile of said object surface comprising a cross-section of said object at said surface contour line;

placing a third cursor on said graphical representation to determine the distance from said third cursor to a line between said first surface point and said second surface point; and displaying on the monitor the distance from said third cursor to the line between said first surface point and said second surface point.

16. The method of claim 1, wherein said image is a two-dimensional image.

17. The method of claim 1, wherein said reference surface is curved.

18. The method of claim 1, wherein an overlay is displayed on the monitor on said image of said object surface indicating the location of said surface contour line on said object surface.

19. A method of determining a profile of an object surface comprising the steps of:

obtaining an image of said object surface with an imager;

displaying on a monitor an image of said object surface;

determining the three-dimensional coordinates of a plurality of points on said object surface using a central processor unit;

selecting a first surface point on said object surface by placing a first cursor on a first pixel of said image corresponding to said first surface point on said object surface;

selecting a second surface point on said object surface by placing a second cursor on a second pixel of said image corresponding to said second surface point on said object surface;

determining the three-dimensional coordinates of said first surface point and said second surface point using the central processor unit;

determining a reference surface based on said three-dimensional coordinates of said first surface point and said second surface point using the central processor unit;

determining the three-dimensional coordinates on said reference surface of a first reference surface point and a second reference surface point corresponding to said first surface point and said second surface point, respectively using the central processor unit;

determining the three-dimensional coordinates of a reference surface line on said reference surface from said first reference surface point to said second reference surface point using the central processor unit;

determining a plurality of points on said reference surface corresponding to said plurality of points on said object surface, where object surface-to-reference surface lines extending from said plurality of points on said object surface are perpendicular to said reference surface and intersect said reference surface at said plurality of points on said reference surface using the central processor unit;

determining the distances on said reference surface from said plurality of points on said reference surface to said reference surface line using the central processor unit;

determining the points on said reference surface on, or within a predetermined distance from, said reference surface line using the central processor unit;

determining the three-dimensional coordinates of a surface contour line on said object surface comprising the points on said object surface corresponding to the points on said reference surface on, or within a predetermined distance from, said reference surface line using the central processor unit; and determining said profile of said object surface by determining the distances from said reference surface to said surface contour line using the central processor unit.

* * * * *